April 17, 1956 P. E. GELDHOF 2,741,925
ALTERNATELY OPERATING ACTUATING MECHANISM
Filed Sept. 8, 1954 4 Sheets-Sheet 1

Inventor
PETER EDUARD GELDHOF
by Hill, Sherman, Meroni, Gross & Simpson Attys.

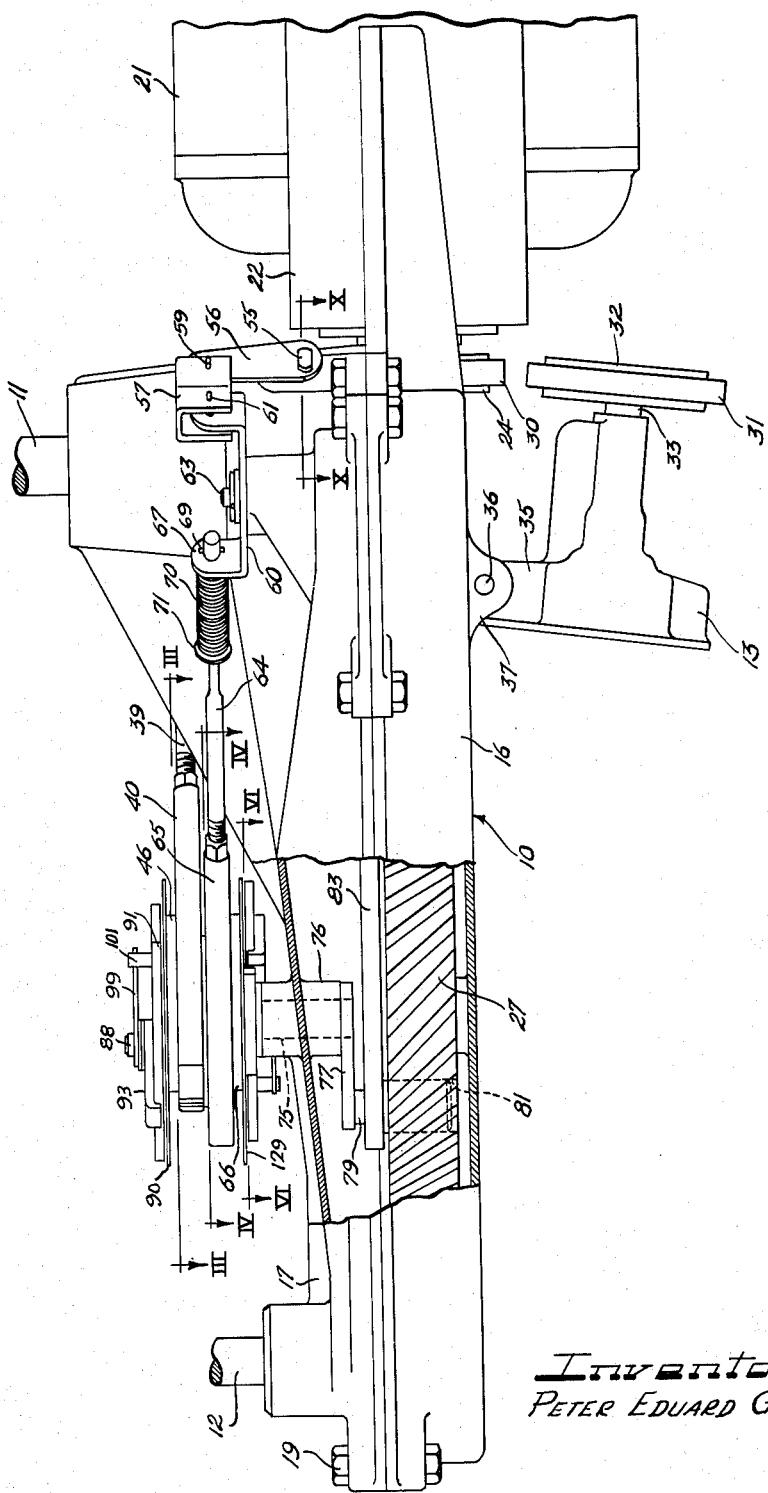

April 17, 1956 P. E. GELDHOF 2,741,925
ALTERNATELY OPERATING ACTUATING MECHANISM
Filed Sept. 8, 1954 4 Sheets-Sheet 3
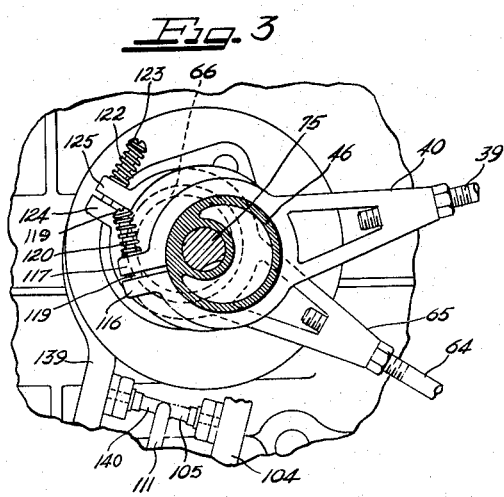
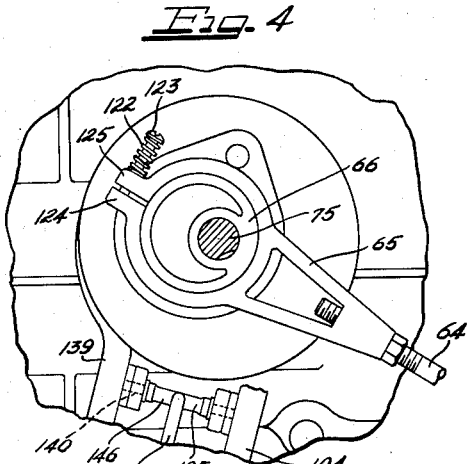
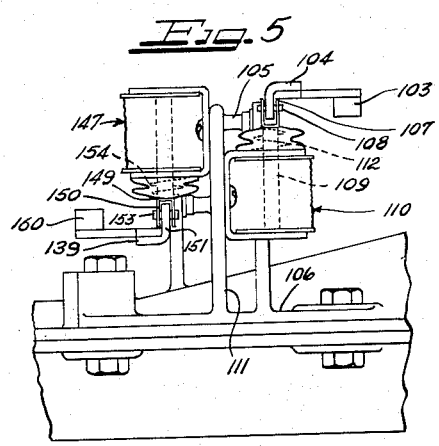
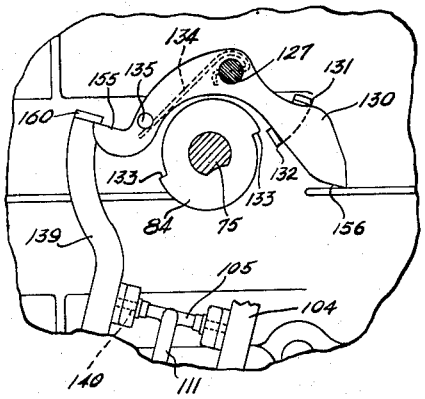
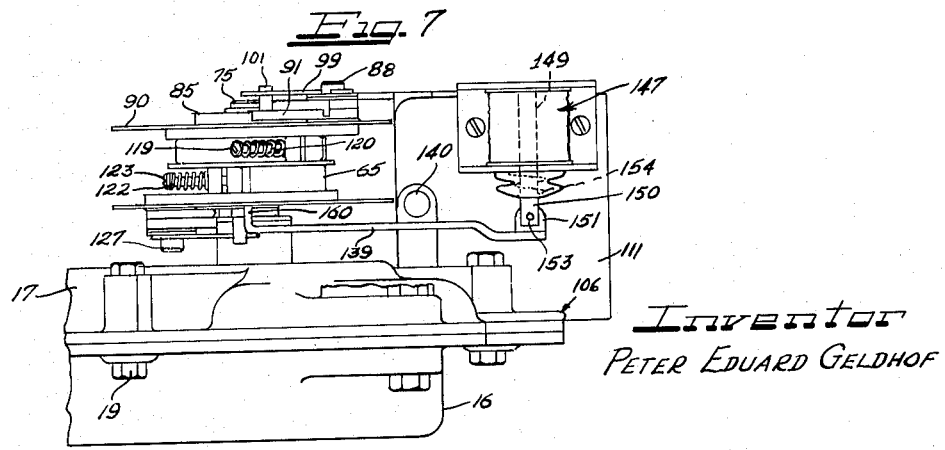
Inventor
PETER EDUARD GELDHOF April 17, 1956 P. E. GELDHOF 2,741,925
ALTERNATELY OPERATING ACTUATING MECHANISM
Filed Sept. 8, 1954 4 Sheets-Sheet 4
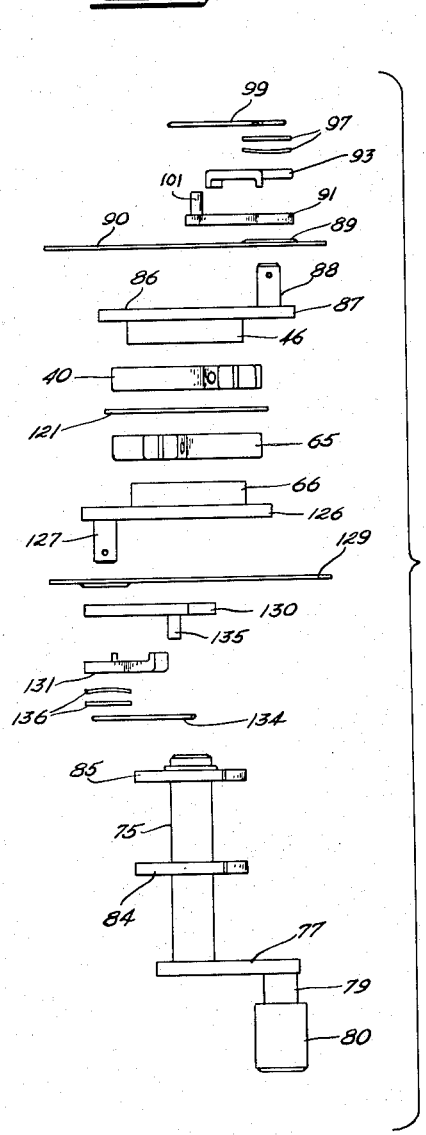
Fig. 8
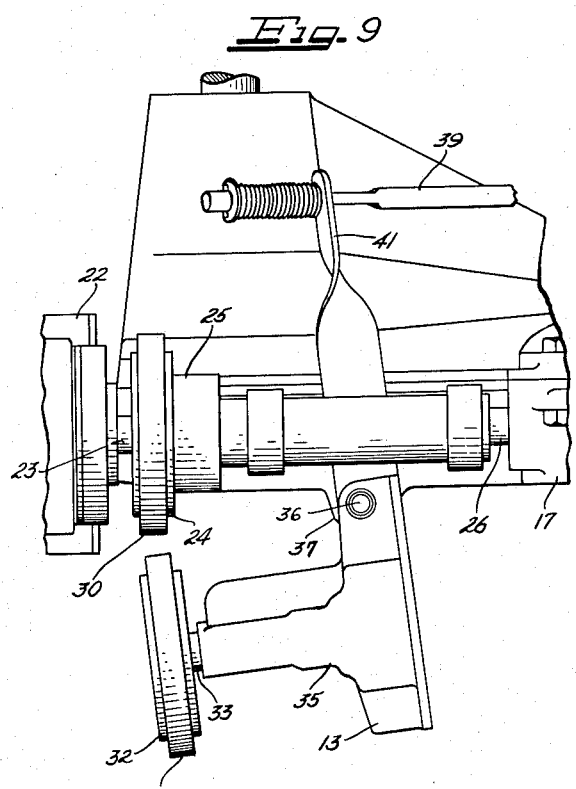
Fig. 9
Fig. 10
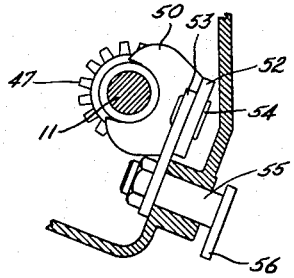
Fig. 11
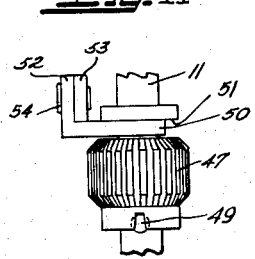
Inventor
PETER EDUARD GELDHOF

United States Patent Office 2,741,925
Patented Apr. 17, 1956

2,741,925

ALTERNATELY OPERATING ACTUATING MECHANISM

Peter Eduard Geldhof, Benton Harbor, Mich., assignor, by mesne assignments, to Whirlpool-Seeger Corporation, St. Joseph, Mich., a corporation of Delaware Application September 8, 1954, Serial No. 454,783

12 Claims. (Cl. 74—70)

This invention relates to improvements in actuating and control mechanisms and more particularly relates to an alternately operating actuating mechanism for controlling the operation of certain component parts of a washing machine and the like.

A principal object of my invention is to provide a simple and improved form of actuating and control mechanism for connecting one driven member with its driving member and disconnecting another driven member from its driving member and vice versa during continuous operation of the driving members.

A further object of my invention is to provide an electrically controlled, actuating and control mechanism particularly adapted to connect an agitator of a washing machine with its oscillating driving member and disconnect a pump from its driving member and vice versa during continuous operation of the driving members therefor.

A still further object of my invention is to provide a novel form of clutch operating mechanism for effecting the shifting of the agitator clutch of a washing machine to drive the agitator from its oscillating drive mechanism, and disconnect the pump from its drive mechanism and vice versa, all under the control of cyclically controlled electrically energizable means.

These and other objects of my invention will appear from time to time as the following specification proceeds and with reference to the accompanying drawings wherein:

Figure 2 is a view in side elevation of the transmission shown in Figure 1 with certain parts of the gear casing broken away and shown in section in order to illustrate the drive to the actuating and control mechanism of my invention;

Figure 3 is a fragmentary sectional view taken substantially along line III—III of Figure 2;

Figure 4 is a fragmentary sectional view taken substantially along line IV—IV of Figure 2;

Figure 5 is a fragmentary end view looking at the transmission along line V—V of Figure 1;

Figure 6 is a fragmentary sectional view taken substantially along line VI—VI of Figure 2;

Figure 7 is a partial fragmentary end view of the transmission looking along line VII—VII of Figure 1;

Figure 8 is an exploded view of the actuating and control mechanism of my invention;

Figure 9 is a fragmentary view in side elevation looking substantially along line IX—IX of Figure 1;

Figure 10 is an enlarged detail sectional view taken substantially along line X—X of Figure 2; and Figure 11 is an enlarged detail fragmentary sectional view in side elevation of the clutch and shifting mechanism shown in Figure 10.

Figure 1:
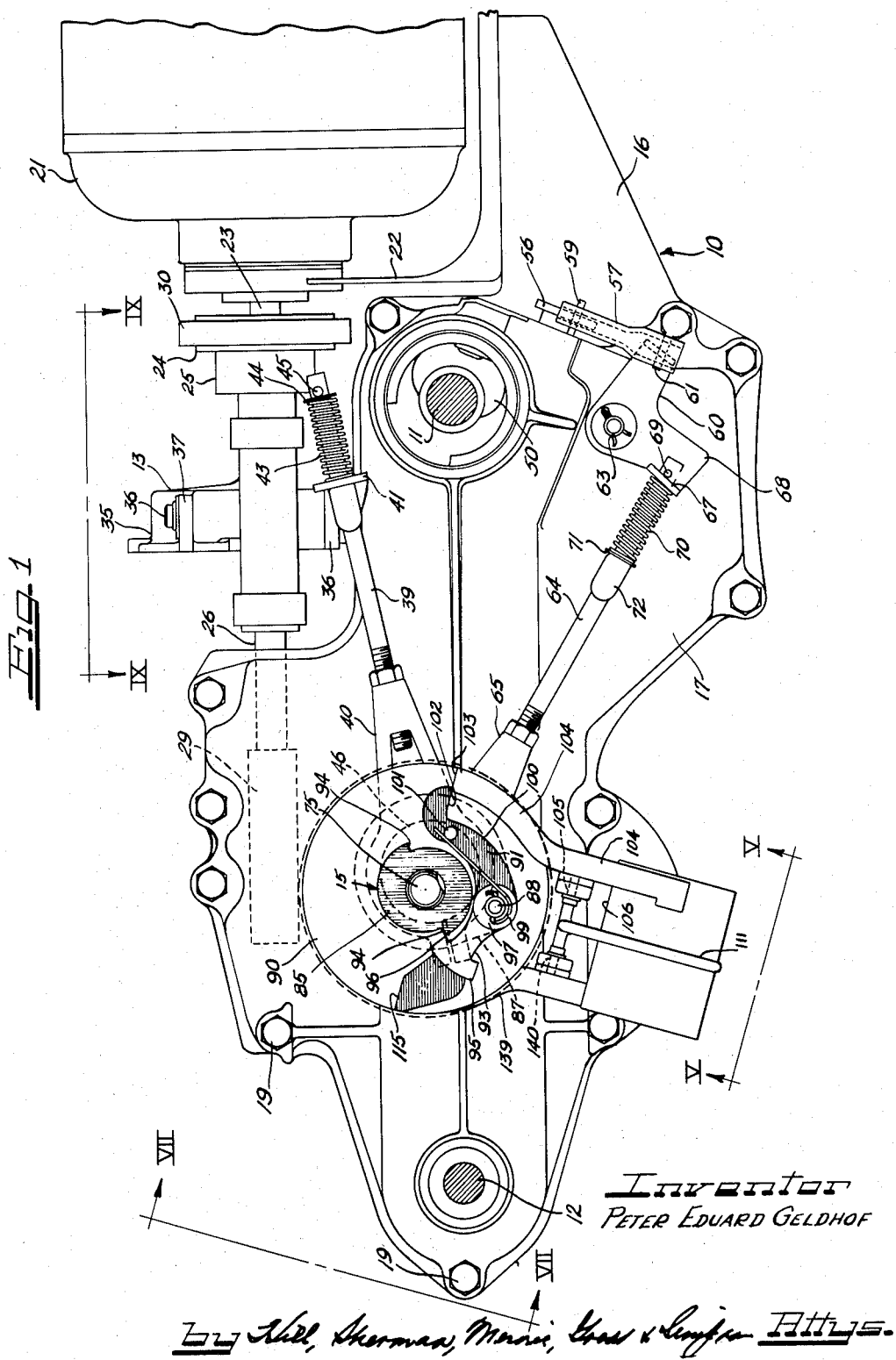
Figure 1 is a top plan view of washing machine control and transmission constructed in accordance with my invention.

In the embodiment of my invention illustrated in the drawings, I have shown in Figure 1 a transmission for a washing machine for oscillatably driving an agitator (not shown) on the upper end of an agitator shaft 11, for rotatably driving a wringer (not shown) driven from the upper end of a wringer shaft 12 and for rotatably driving a pump 13, the drive to the agitator shaft and pump all being under the selective control of a cyclically controlled selectively operable control mechanism indicated generally by reference character 15, for effecting a drive to the agitator shaft 11 when the pump 13 is not in operation, and vice versa.

The transmission gearing for driving the agitator shaft 11 and the wringer shaft 12 are all contained within a gear case 16 having a top cover 17 secured thereto as by nuts and bolts 19, 19 and having the usual gasket (not shown) interposed between said gear case and top cover to enable the transmission gearing contained within said gear case to run in oil.

A motor 21 is shown as being mounted on a gear case 16 on a bracket 22, supporting opposite ends of said motor and extending from said gear case to one side of the agitator shaft 11. For purposes of illustrating my invention, one end only of the bracket 22 is herein shown. Said bracket may be of a well known form commonly used to support washing machine motors and is no part of my present invention so need not herein be shown or described further.

The motor 21 is shown as having a motor shaft 23 connected with a friction drive wheel 24 through a coupling indicated generally by reference character 25. The coupling 25 in turn drives a shaft 26 aligned with the motor shaft 23 and extending within the transmission casing and shown as driving a helical drive gear 27 through a mating helical or worm gear 29.

The friction wheel 24 is shown as having a friction surface 30, on its periphery, adapted to be engaged by a friction surface 31 on a friction wheel 32 on the end of a drive shaft 33 for the pump 13, for driving the pump.

The pump 13 is shown as having a casing 35 pivotally mounted on the gear case 16 on a transverse pivot shaft 36 mounted at its ends in a bracket member 37 depending from said gear case.

The pump housing 35 and pump 13 are shown as being mounted for pivotal movement about the axis of the transverse shaft 36 to bring the friction surface 31 into engagement with the friction surface 30 and effect a drive to the pump 13 by means of a link 39 extending from an eccentric strap 40. The link 39 is shown as extending through the upper end of an arm 41 projecting upwardly from the pump casing 35. A spring 43 encircles the outer end of the link 39 and abuts said arm at its inner end and is retained to said link as by a washer 44 and pin 45. The eccentric strap 40 is shown as being mounted on an eccentric 46 and as having frictional engagement therewith and as being moved in a direction to engage the friction surface 31 with the friction surface 30 upon movement of the eccentric 46 for a half revolution in a direction, which in Figure 1 is shown as being a clockwise direction as will hereinafter more clearly appear as this specification proceeds.

The agitator shaft 11 is oscillatably driven through an oscillatable gear 47. The gear 47 is slidably mounted on the shaft 11 and has interengagement with a pin 49 on said agitator shaft and forming a clutch to effect an oscillatable drive to said agitator shaft upon downward movement of the gear 47 under the control of a clutch yoke 50. The clutch yoke 50 is shown as engaging under a clutch collar 51 at the upper side of the gear 47, and as having an upright ear or lug 52 having a link or crank arm 53 pivoted thereon on a pivot pin 54. The crank arm 53 is shown as being secured to the inner end of a rock shaft 55, pivoted in the wall of the gear casing 16.

A crank arm 56 is keyed or otherwise secured to the outer end of the rock shaft 55, for operating the same.

The crank arm 56 is shown as extending between a downwardly opening channel-like link 57, and as being pivotally connected to one end thereof by a pivot pin 59 (Figures 1 and 2). The opposite end of the link 57 from the crank arm 56 is shown as being pivoted to one lever arm of a bell crank 60, as by a pivot pin 61. The bell crank 60 is shown as being mounted on a vertical pivot pin 63, and as being operated by a link 64 on the end of an eccentric strap 65 mounted on an eccentric 66 and frictionally engaged therewith as will hereinafter more clearly appear as this specification proceeds. The link 64 is shown as extending through an upright ear 67 on an arm 68 of the bell crank 60 and as having a pin 69 abutting the outer side of said ear. The pin 69 is biased into engagement with the ear 67 by a compression spring 70 encircling the link 64 and engaging the ear 67 at one end and seated against a washer 71 bearing against an enlarged diameter portion 72 of the link 64 at its opposite end.

Referring now in particular to the cyclically controlled actuating mechanism of my invention for independently driving the eccentrics 46 and 66 to effect a drive to one mechanism and disengage the drive to another mechanism and vice versa, a vertical drive shaft 75 is shown in Figures 1 and 2 as being journalled in a boss 76 in the cover 17 and extending upwardly above said cover and downwardly below said cover within the gear casing 16. The drive shaft 75 has a crank arm 77 keyed or otherwise secured thereto, having a pin 79 secured to its outer end and depending therefrom. A roller 80 rotatably mounted on the pin 79 is engageable wihin a socket or recess 81 formed in the face of the gear 27 for rotatably driving the crank 77 and shaft 75 upon rotation of the gear 27. A link 83 is shown as being journaled on the pin 79. The link 83 forms an oscillatable drive member for oscillatably driving the gear 47 in a well known manner, and is no part of my present invention so need not herein be shown or described further.

The shaft 75 is shown in Figures 2 and 7 as extending upwardly from the portion of the boss 76 projecting above cover 17 and has two vertically spaced ratchet wheels 84 and 85, mounted thereon (Figure 8).

The ratchet wheel 84 is disposed just above the top of the boss 76 and serves to operate the eccentric 66 and effect operation of the bell crank 60 to engage or disengage the clutch formed by the pin 49 on the shaft 11, and engage or disengage the drive to the agitator shaft 11.

The ratchet wheel 85 is shown as being secured to the shaft 75 adjacent the upper end of said shaft and as being rotated thereby to effect a drive to the eccentric 46, to operate the eccentric strap 40 and link 39, to engage the friction surface 31 with the friction surface 30 and effect a drive to the pump 13 when the agitator shaft 11 is not in operation or to disengage said friction surfaces from each other when the agitator shaft is in operation.

The eccentric 46 is shown as being mounted on the shaft 75 eccentric of its center and beneath the ratchet wheel 85. The eccentric 46 is also shown as having an upper flanged portion 86 having an ear 87 projecting therefrom having a pivot pin 88 extending upwardly therefrom through an apertured portion 89 of a disc or washer 90. Pivotally mounted on the pin 88 and extending to opposite sides thereof is a dogging lever 91 having a pawl 93 carried thereby for engagement with either of two ratchet teeth 94, 94 of the ratchet wheel 85. The pawl 93 is shown as being pivotally mounted on the pivot pin 88 and as having downwardly extending legs 95 and 96, extending downwardly along opposite sides of the dogging lever 91, the inner of which legs 96 is engageable with a ratchet tooth 94, to effect rotation of the pin 88 and eccentric 46 with the ratchet wheel 85, as will hereinafter more clearly appear as this specification proceeds. Yieldably holding the pawl 93 downwardly into engagement with the dogging lever 91 is a pair of spring washers 97, held in engagement with the pawl 93 by the inturned end of a torsion spring 99 extending through the pin 88 above the spring washers 97. The torsion spring 99 is shown as extending from the pin 88 along an arm 100 of the dogging lever 91 and as abutting a pin 101 projecting upwardly from said dogging lever and biasing said dogging lever in a clockwise direction to engage a radial face 102 thereof, with a stop 103 formed by the depending end of the pivoted release arm 104.

The release arm 104 is shown as being pivoted intermediate its ends on a pivot pin 105 extending from an upright leg 111 of a bracket 106 projecting upwardly from the top cover 17. The opposite end of the release arm 104 from the stop 103 is shown in Figure 5 as being turned downwardly to extend within a yoke 107, and as being connected to said yoke as by a pivot pin 108. The yoke 107 is in turn shown as extending upwardly from an armature 109 of a solenoid 110 secured to the leg 111 of the bracket 106 and extending to one side thereof. A compression spring 112 is shown as encircling the upper end portion of the armature 109 and as biasing the armature 109 in the upwardly extended position shown in Figure 5, to bias the stop 103 into position to engage the radial end 102 of the dogging lever 91, when the solenoid 110 is deenergized, and hold the pin 88 and eccentric 46 from movement with the ratchet wheel 85 and thus hold the pawl 93 out of engagement with either of the teeth 94 of said ratchet wheel.

Upon energization of the solenoid 110 the armature 109 will thus be retracted within a solenoid coil and effect pivotal movement of the release 104 in a direction to disengage the stop 103 from the radial end face 102 of the dogging lever 91 and release the same. The torsion spring 99 will then pivot said dogging lever in a clockwise direction and engage the end 96 of the pawl 93 with the tooth 94 and effect the rotation of the pawl 93, dogging lever 91 and eccentric 86 with the ratchet wheel 85 for one one-half a revolution. As the pin 88 and eccentric 46 rotate for half a revolution an opposite engaging end 115 of the dogging lever 91 diametrically opposed to the engaging end 102 of the dogging lever 91 will come into engagement with the stop 103. This will pivot the dogging lever 91 about the pin 88 in a counterclockwise direction and release the leg 96 of the pawl 93 from the tooth 94 of the ratchet 85, accommodating the ratchet wheel 85 to continue to rotate and holding the eccentric 46 from rotation.

The eccentric strap 40 is shown as being split and as having lugs 116 and 117 extending generally radially outward from the margins of the split portion thereof. A threaded pin 119 is shown as extending from the lug 116 through the lug 117 and as being threaded in the lug 116. A spring 120 is shown as encircling the threaded pin 119 and as being interposed between the head thereof and the lug 117, to yieldably engage the eccentric strap 40 with the eccentric 46 and effect a predetermined frictional resistance therebetween, to prevent over-travel of the eccentric 46 and maintain the pump 13 in position at the ends of the strokes of said strap.

It should here be understood, that as the eccentric 46 moves 180° from the position shown in Figure 1 to a position where the engaging face 115 of said dogging lever comes into engagement with the stop 103, that the eccentric 46 will have completely retracted the eccentric strap 40 and link 39 to pivot the pump casing 35 and pump 13 about the axis of the pivot pin 37 in posittion to engage the friction surface 31 of the friction wheel 32 with the friction surface 30 of the friction wheel 24 and effect a drive to the pump 13. It should further be understood that since the stop is in engagement with the engaging face 115 of the dogging lever 91, that the pin 88 and eccentric 46 are held stationary, and that the pump 37 is driven as long as the engaging face 115 is in engagement with the stop 103 and until said stop is released by energization of the solenoid 110. The solenoid 110 is only energized a sufficient length of time to release the stop 103 from either of the engaging faces 102 or 115.

Beneath the eccentric strap 40 and eccentric 46 on the shaft 75 is a washer 121, separating the eccentric 46 and eccentric strap 40 from the eccentric 66 and the eccentric strap 65. The eccentric strap 65 like the eccentric strap 40 is split and is frictionally engaged with eccentric 66 by a spring 122 on a pin 123 threaded in a lug 124, extending from the eccentric strap 65 and extending through a lug 125 of said eccentric strap. The pin 123 may be adjusted to vary the frictional resistance between said eccentric and eccentric strap and prevent overtravel of said eccentric and hold the bell crank 60 in posittion at the ends of the strokes thereof.

The lower end portion of the eccentric 66 is shown as having a flange 126 like the flange 86 of the eccentric 46 and having a pin 127 depending therefrom and extending through an apertured portion of a plate or washer 129. A dogging lever 130, like the dogging lever 91 is shown as being pivotally mounted on the pin 127 and as having a pawl 131 mounted thereon on the pin 127. The pawl 131 has a leg 132 extending upwardly along the ratchet wheel 84, for engagement with either one of two ratchet teeth 133 on said ratchet wheel 66. A spring 134 is hooked on the pin 127 and engages a pin 135, depending from the dogging lever 130 for biasing the dogging lever 130 in a clockwise direction and moving the leg 132 of the ratchet wheel 131 into position to engage either of the teeth 133 upon rotation of the ratchet wheel 84 as previously described. Spring washers 136 are interposed between the hooked end of the spring 134 and the pawl 131 to frictionally engage said pawl with the upper surface of the dogging lever 130 as previously described in connection with the dogging lever 91 and pawl 93.

A release lever 139 is pivoted on a pin 140, extending laterally from the opposite side of the leg 111 of the bracket 106 from the pivot pin 105. A solenoid 147 is shown as being mounted on the leg 111 and as having an armature 149 depending therefrom, having a yoke 150 extending along opposite sides of an upturned end 151 of the release lever 139, and pivoted to the yoke 150 as by a pivot pin 153. A spring 154 is provided to bias the armature 149 in the extended position shown in Figure 5 and to bias a stop 160 on the opposite end of the release arm 139 from the solenoid 147 into position to engage either one of two diametrically opposed radial engaging faces 155 or 156 on opposite ends of the dogging lever 130.

Thus, upon energization of the solenoid 147, the stop 160 is moved out of engagement with engaging face 155 of the dogging lever 130 to release the same. The torsion spring 134 will then engage the leg 132 of the pawl 131 with either one of the teeth 133 of the ratchet wheel 84 and effect rotation of the eccentric 66 one-half revolution until the engaging face 156 of the dogging lever 130 comes into engagement with the stop 160. The pawl 131 will then be disengaged from the ratchet wheel 84 and the eccentric strap 65 and link 64 will have been moved in position to engage the clutch effecting the oscillatable drive to the agitator shaft 11, and hold the clutch in such a position under the bias of the spring 70 as shown in Figure 1.

It should here be understood that the solenoids 110 and 147 are only energized a sufficient length of time to disengage the respective stops from the respective dogging levers and then are de-energized to accommodate the biasing levers therefor to again position the respective stop into engagement with the respective dogging lever after the dogging lever has rotated 180°, to hold the respective clutch in the engaged or disengaged posittion desired.

It should also be understood that the solenoids 110 and 147 are individually energized, but that the control circuit therefor may be interlocked to effect disengagement of the agitator drive clutch when the pump is being driven and vice versa.

It should be understood, however, that if desired either one of the two solenoids 110 or 147 may be energized independently of the other or that two may be energized together where it is desired to control two mechanisms that are not usually alternately operated.

It will be understood that modifications and variations of the present invention may be effected without departing from spirit and scope of the novel concepts thereof.

I claim as my invention:

1. An operating mechanism particularly adapted for washing machines and the like comprising a continuously rotating shaft, an eccentric freely mounted thereon, pawl and ratchet means on said shaft, means selectively operable to engage said pawl and ratchet means and effect rotation of said eccentric, an eccentric strap on said eccentric having connection with a device to be operated for operating the same into one of two positions, and yieldable means frictionally engaging said eccentric strap with said eccentric and preventing overtravel thereof and maintaining said eccentric and device to be operated at the ends of the operating cycles of said eccentric.

2. An operating mechanism particularly adapted for washing machines and the like comprising a continuously rotating shaft, an eccentric freely mounted on said shaft, a ratchet on said shaft and rotatably driven thereby, a pawl on said eccentric and biased for engagement with said ratchet device, stop means selectively operable to release said pawl from said ratchet device at the ends of predetermined movements of said eccentric, an eccentric strap on said eccentric, a rocking member having connection with a device to be operated, an operative connection between said eccentric strap and the rocking member for operating the same, said eccentric strap being split to enable said eccentric strap to have frictional engagement with said eccentric, and spring means having engagement with the split end portions of said eccentric strap for yieldably engaging said eccentric strap with said eccentric and maintaining said eccentric in position at the end of an operative cycle.

3. A control mechanism particularly adapted for a washing machine having a continuously driven shaft, a ratchet wheel on said shaft and rotatably driven thereby, an eccentric freely mounted on said shaft and having a pawl pivoted thereon for engagement with said ratchet wheel, spring means biasing said pawl into engagement with said ratchet wheel for driving said eccentric through said ratchet wheel, an eccentric strap on said eccentric having operative connection with a device to be operated, a pivoted release lever engageable with said pawl to move said pawl out of engagement with said ratchet wheel, spring means biasing said release lever to engage said pawl, electrically energizable means for releasing said release lever from said pawl and accommodating rotation of said pawl and eccentric for 180 degrees, said eccentric strap being split and spring means having engagement with the adjacent end portions of said eccentric strap and frictionally engaging said eccentric strap with said eccentric, to prevent overtravel thereof and to maintain the device to be operated in its several operative positions.

4. A control mechanism particularly adapted for a washing machine having a continuously driven shaft, a ratchet wheel on said shaft and rotatably driven thereby, an eccentric freely mounted on said shaft and having a pawl pivoted thereon for engagement with said ratchet wheel, spring means biasing said pawl into engagement with said ratchet wheel for driving said eccentric through said ratchet wheel, an eccentric strap on said eccentric having operative connection with a device to be operated, a pivoted release lever, engageable with said pawl to move said pawl out of engagement with said ratchet wheel, spring means biasing said release lever into position to engage said pawl and a solenoid energizable to release said release lever from said pawl.

5. An operating and control mechanism particularly adapted for a washing machine and the like comprising a motor, a member to be driven, a continuously rotating shaft driven by said motor, a ratchet wheel on said shaft and rotatably driven thereby, an eccentric freely mounted on said shaft and having a pawl pivoted thereon for engagement with said ratchet wheel, spring means biasing said pawl into position to engage said ratchet wheel for driving said eccentric thereby, an eccentric strap on said eccentric having operative connection with said member to be driven for effecting a drive thereto upon operation of said eccentric, a movable stop biased to engage said pawl and hold said pawl out of engagement with said ratchet wheel, cyclic control means having operative connection with said stop, and operative to move said stop to release said pawl and effect rotation of said ratchet with said ratchet wheel, and a drive connection to said member to be driven.

6. An operating and control mechanism particularly adapted for a washing machine and the like comprising a motor, a member to be driven, a continuously rotating shaft driven by said motor, a ratchet wheel on said shaft and rotatably driven thereby, an eccentric freely mounted on said shaft and having a pawl pivoted thereon for engagement with said ratchet wheel, spring means biasing said pawl into position to engage said ratchet wheel for driving said eccentric thereby, a split eccentric strap on said eccentric having operative connection with said member to be driven for effecting a drive thereto upon operation of said eccentric, a movable stop biased to engage said pawl and hold said pawl out of engagement with said ratchet wheel, and cyclic control means having operative connection with said stop and operative to move said stop to release said pawl and effect rotation of said ratchet and eccentric with said ratchet wheel and a drive connection to said member to be driven, and yieldable means engaging the adjacent ends of said eccentric strap at the split portion thereof and frictionally engaging said eccentric strap with said eccentric and holding said eccentric from overtravel and maintaining the drive connection with said member to be driven.

7. An actuating control for a washing machine and the like comprising a gear casing, an oscillatable drive shaft in said gear casing, a vertical shaft journaled in said gear casing and extending thereabove, a motor, a gear rotatably driven by said motor and having a socket opening to the top thereof, a crank for rotating said last mentioned shaft and having an end portion extending within said socket, a gear on said oscillatable drive shaft, a clutch for connecting said gear with said shaft, a rocking lever for operating said clutch, a link on said crank for oscillatably driving said last mentioned gear, and a solenoid controlled drive connection from said first mentioned gear for moving said clutch in engaged and disengaged positions comprising an eccentric having an eccentric strap thereon having connection with said rocking lever for rocking the same, pawl and ratchet means for operating said eccentric, and yieldable means maintaining said eccentric strap in frictional engagement with said eccentric and maintaining said rocking lever in position at the ends of the operative strokes thereof.

8. In an actuating and control mechanism for a washing machine and the like having an agitator drive shaft, a rotatably driven gear and a reciprocable drive member for oscillatably driving said shaft, a housing for said gear having a vertical shaft journalled therein extending upwardly from said housing and projecting within said housing, a crank on the end of said shaft, a pin and socket connection between said gear and crank for rotatably driving said vertical shaft, a ratchet wheel on said shaft on the outside of said housing and rotatably driven thereby, an eccentric freely mounted on said shaft and having a pawl pivoted thereon, spring means biasing said pawl into engagement with said ratchet wheel for rotating said pawl and eccentric, an eccentric strap on said eccentric having connection with a device to be operated, a stop operative to release said pawl from said ratchet wheel and hold said eccentric from rotation, spring means biasing said stop into position to release said pawl from said ratchet, and a solenoid energizable to move said stop out of position to release said pawl from said ratchet and effect engagement of said pawl with said ratchet wheel to rotate said eccentric.

9. In an actuating mechanism particularly adapted for washing machines and the like to effect certain driving operations, a continuously rotatable shaft, means for rotatably driving said shaft, spaced ratchet wheels on said shaft rotatably driven thereby, a separate eccentric associated with each of said ratchet wheels, each of said eccentrics having connection with a mechanism to be operated and one moving the associated mechanism into an operative position while the other moves the associated mechanism into an inoperative position, and means for selectively driving said eccentrics comprising a pawl pivotally mounted on each of said eccentrics, separate spring means biasing an associated pawl into engagement with an associated ratchet wheel, for effecting the rotatable drive of said pawl and associated eccentric with an associated ratchet wheel, a separate pivoted stop for each pawl, engageable with said pawls at diametrically opposed points, spring means biasing said stop to engage said pawls and hold the same out of engagement with said ratchet wheels, and electrically energizable means for moving said stops against the bias of said spring means, to release said pawls to engage said ratchet wheels.

10. In a transmission device for washing machines and the like, a casing, a gear within said casing, a motor, a drive connection from said motor to said gear, a vertical shaft journalled in said casing and having an inner end projecting within said casing and an outer end extending thereabove, a crank on the inner end of said shaft, a socket in said gear, a pin depending from said crank and extending within said socket, an oscillating agitator drive shaft journalled within said casing, an operative connection to said agitator drive shaft for oscillatably driving the same including a link pivotally mounted on said pin, and a gear oscillatably driven thereby, clutch means for connecting and disconnecting said gear from said agitator drive shaft, and means driven by said first mentioned vertical shaft for operating said clutch means comprising a ratchet wheel on said shaft and rotatably driven thereby, an eccentric freely mounted on said shaft, an eccentric strap on said eccentric having operative connection with said clutch means, a dogging lever on said eccentric, a pawl on said dogging lever for engagement with said ratchet wheel, to effect the rotation of said eccentric with said ratchet wheel, a stop engageable with said dogging lever for moving said pawl out of engagement with said ratchet wheel, spring means biasing said pawl into engagement with said ratchet wheel, a stop engageable with said ratchet wheel, spring means biasing said stop to engage said dogging lever and electrically engageable means engaging with said stop for moving said pawl out of engagement with said dogging lever and effect rotation of said eccentric to engage said clutch.

11. An alternately operating actuating and control mechanism of a type adapted to connect one driven member with its driving member and disconnect another driven member from its driving member and vice versa including a continuously driven shaft, spaced ratchet wheels on said shaft and continuously driven thereby, spaced eccentrics on said shaft, selective drive connections between said ratchet wheels and said eccentrics comprising a dogging lever pivotally mounted on each eccentric, a pawl on each dogging lever, spring means biasing said dogging lever to engage said pawls with said ratchet wheel, to effect the rotation of said eccentrics with said ratchet wheels, said dogging levers having spaced diametrically opposed engaging arms, pivoted stops engageable with either of said arms, to disengage said pawls from said ratchet wheels, spring means biasing said stops into position to engage said arms, and selectively energizable solenoids operative to move said stops against the bias of said spring means and release the same from said dogging levers and effect a drive therefrom.

12. An alternatively operating actuating and control mechanism of a type adapted to connect one driven member with its driving member and disconnect another driven member from its driving member and vice versa including a continuously driven shaft, spaced ratchet wheels on said shaft and continuously driven thereby, spaced eccentrics on said shaft, selective drive connections between said ratchet wheels and said eccentrics comprising a dogging lever pivotally mounted on each eccentric, a pawl on each dogging lever, spring means biasing said dogging levers to engage said pawls with said ratchet wheels to effect rotation of said eccentrics with said ratchet wheels, said dogging levers having spaced diametrically opposed engaging arms, pivoted stops engageable with either of said arms to disengage said pawls from said ratchet wheels, spring means biasing said stops into position to engage said arms, electrically energizable means associated with each of said stops and operative to move said stops against the bias of said spring means and release the same from said dogging levers and effect a drive therefrom, said eccentric straps being split, and means biasing the adjacent ends of said eccentric straps toward each other and frictionally engaging said eccentric straps with said eccentrics to prevent overtravel of said eccentrics and maintain said eccentrics in position at the ends of the operative cycles thereof.

References Cited in the file of this patent

UNITED STATES PATENTS

| | | |
|---|---|---|
| 2,197,559 | Mikulasek | Apr. 16, 1940 |
| 2,347,190 | Geldhof | Apr. 25, 1944 |
| 2,350,108 | Geldhof | May 30, 1944 |
| 2,361,767 | Hays | Oct. 31, 1944 |